United States Patent [19]

Taylor et al.

[11] Patent Number: 4,913,464
[45] Date of Patent: Apr. 3, 1990

[54] TUBULAR JOINT WITH SEAL

[75] Inventors: William M. Taylor, Houston, Tex.; William Hopson, Wakefield, England

[73] Assignee: Cameron Iron Works U.S.A., Inc., Houston, Tex.

[21] Appl. No.: 182,204

[22] Filed: Apr. 15, 1988

[30] Foreign Application Priority Data

Mar. 1, 1988 [EP] European Pat. Off. ......... 88301769.1

[51] Int. Cl.$^4$ ............................................. F16L 55/18
[52] U.S. Cl. ................................... 285/15; 29/402.02; 277/9; 285/93; 285/334.2; 285/382.4; 285/422
[58] Field of Search .................. 285/334.2, 382.4, 379, 285/915, 15, 93, 16, 422, 334.5, 329; 277/9, 181; 29/402.02

[56] References Cited

U.S. PATENT DOCUMENTS

| | | | |
|---|---|---|---|
| 2,028,316 | 1/1936 | Brunner | 285/334.5 X |
| 2,424,727 | 7/1947 | Wenk | 285/334.5 X |
| 2,635,900 | 4/1953 | Mayo et al. | 285/334.2 X |
| 3,472,062 | 10/1969 | Owen | 285/93 X |
| 3,877,730 | 4/1975 | Frantz | 285/15 |
| 4,029,345 | 6/1977 | Romanelli | 285/334.2 |
| 4,474,381 | 10/1984 | Wilkins et al. | 285/15 X |
| 4,648,626 | 3/1987 | Vinciguerra et al. | 285/382.4 X |
| 4,695,080 | 9/1987 | Oetiker | 285/915 X |

FOREIGN PATENT DOCUMENTS 2003244  3/1979  United Kingdom ............... 285/915

Primary Examiner—Dave W. Arola

[57] ABSTRACT

An improved tubular joint between two tubular members having their mating ends with inner sealing surfaces tapering outward in the direction toward the other tubular member and with a sealing ring having outer sealing surfaces for engaging the inner sealing surfaces of the tubular members. The improvement lies in the provision of an insert sleeve having a tapered portion and a tubular portion, the insert sleeve is cold forged in place over a damaged sealing surface of one of the tubular members and has a tapered inner sealing surface for sealing with the outer surface of the sealing ring. This improved joint is particularly useful in subsea wellheads. The tight gripping and sealing engagement of the insert sleeve within the tubular member is augmented by grooves within a recess on the interior of the tubular member being repaired or sharp annular teeth around the exterior of the tubular portion of the insert sleeve. In a modified form of the invention, the insert sleeve includes external sharp teeth which when cold forged into a housing recess will dig into the recess surface to provide the tight gripping and sealing engagement. Further a test port is provided to determine the effectiveness of the sealing engagement of the insert sleeve within the housing.

15 Claims, 6 Drawing Sheets

TUBULAR JOINT WITH SEAL

BACKGROUND

The present invention relates to an improved tubular joint with a metal seal ring positioned between interior tapered sealing surfaces on the ends of the tubular members. Prior to the present invention considerable problems have arisen when damage to either of the sealing surfaces on the tubular members has occurred. This can prevent the metal seal ring from providing the desired seal and the machining of the end of the tubular member may result in the tubular member being below tolerances for its pressure rating. This may require that the damaged tubular member be replaced or that the surface be reworked by welding and remachining.

The R. E. Latham et al Pat. No. 3,404,902 discloses a joint for tubular members with a ring sealing against tapered sealing surfaces formed on the interior at the ends of both members. The sealing ring has an outer central alignment ring portion with outer end sealing surfaces and relieved surfaces between the central alignment ring portion and the sealing surfaces.

The R. L. Wilkins et al Pat. No. 4,474,381 discloses a modified metal seal ring for a tubular joint with a port being provided through the seal ring from a point midway on at least one of its outer sealing surfaces to the interior of the ring to prevent damage to the tubular member sealing surface beyond that which could be sealed by a replacement seal ring.

SUMMARY

The present invention is directed to an improved tubular joint between two tubular members having their mating ends with inner sealing surfaces tapering outward in the direction toward the other tubular member and with a metal sealing ring having outer sealing surfaces for engaging the inner sealing surfaces of the tubular members. The improvement lies in the provision of an insert sleeve which is cold forged within the tubular member with the damaged sealing surface and in covering relationship to the damaged sealing surface and has a tapered inner sealing surface for sealing with the outer surface of a sealing ring.

An object of the present invention is to provide an improved tubular joint which, having had one of the tubular member's tapered sealing surface damaged, can be provided with a new sealing surface without the removal of both tubular members from their environment.

Another object is to provide an improved method of repairing the internal sealing surface at the end of a tubular member in location even when such location is underwater or otherwise remote from the operator.

A further object is to provide an improved insert sleeve for a tubular member which, when installed over the damaged sealing surface of the tubular member, provides a suitable and substantially integral sealing surface for the tubular member.

BRIEF DESCRIPTION OF THE DRAWINGS

These and other object and advantages of the present invention are hereinafter set forth and explained with reference to the, drawings wherein.

DESCRIPTION OF THE PREFERRED EMBODIMENT

Figure 1:
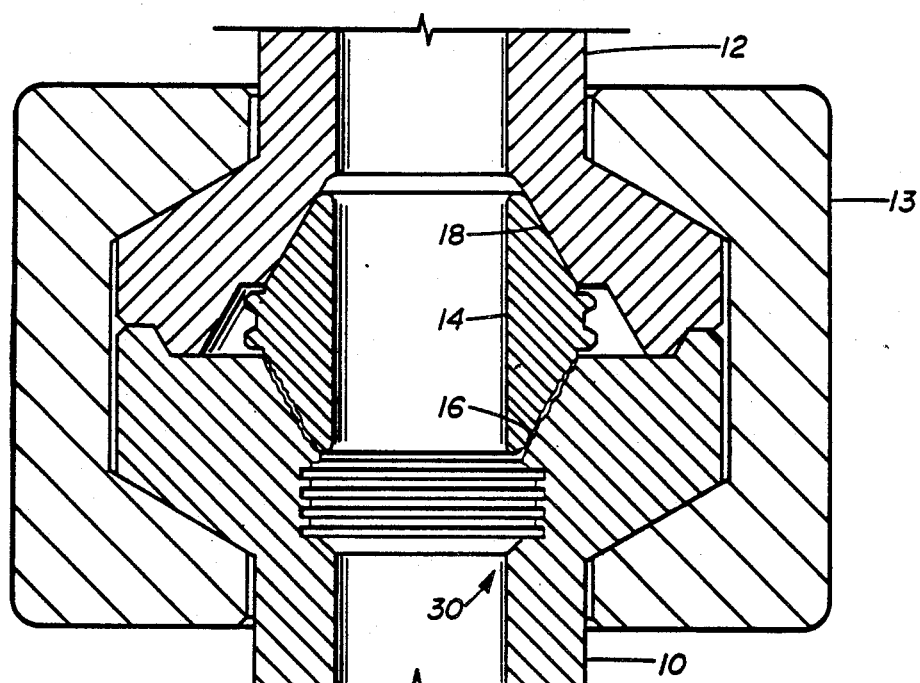
FIG. 1 is a sectional view of a joint between tubular members in which the sealing surface of one of the tubular members has been damaged.

In FIG. 1, tubular wellhead housing 10 is shown connected to tubular connector 12 by a suitable external clamp 13 and having sealing ring 14 positioned between the inner tapered sealing surfaces 16 and 18 on the ends of housing 10 and connector 12. In this illustration, sealing surface 16 has been damaged and a new sealing surface needs to be provided for sealing of the joint between housing 10 and connector 12.

In order to repair the joint and ensure a good seal, it has been the practice to remove the wellhead housing from its location and correct the damaged portion of its sealing surface 16 by adding weld metal and remachining surface 16 to its desired smoothness and taper.

Figure 2:
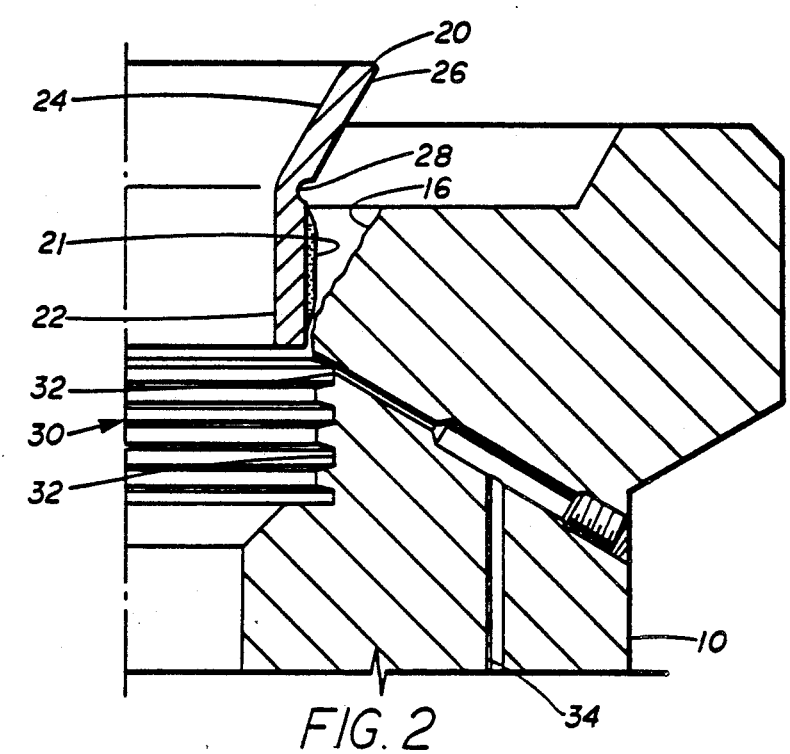
FIG. 2 is a partial sectional view of the improved insert of the present invention being lowered into position on the damaged sealing surface of the tubular member.

With the improvement of the present invention, it is only necessary to remove connector 12 and sealing ring 14 while leaving housing 10 in its location (such as in a subsea well). With connector 12 and sealing ring 14 removed, new sealing sleeve 20 is lowered into its position against damaged sealing surface 16 on housing 10. Sleeve 20 includes lower tubular portion 22 connected to upper tapered portion 24 which tapers outwardly and upwardly so that its outer surface 26 substantially mates with sealing surface 16 on housing 10. Lower tubular portion 22 of sleeve 20 is provided with reduced neck 28 connecting it to upper tapered portion 24. Lower portion 22 when sleeve 20 is in position is immediately within but spaced from recess 30 on the interior of housing 10 immediately below original sealing surface 16. Recess 30 includes a series of grooves 32 into which lower portion 22 of sleeve 20 is to be forged as hereinafter described. Test port 34 extends through housing 10 to detect any leakage past sleeve 20. A volume compensating material 21 may be bonded to the exterior of sleeve 20 (FIG. 2) or in grooves 32 in housing 10 (FIG. 4) so that during its forging, liquids trapped between sleeve 20 and housing 10 will not prevent the proper forging of sleeve 20 into tight engagement with sealing surface 16 and the interior of recess 30. Such volume compensating material is any suitable material which contains voids which will compress when exposed to forging pressures. Examples of such material is syntactic foam, microspheres in an epoxy matrix or a hollow metal 0 ring.

Figure 3:
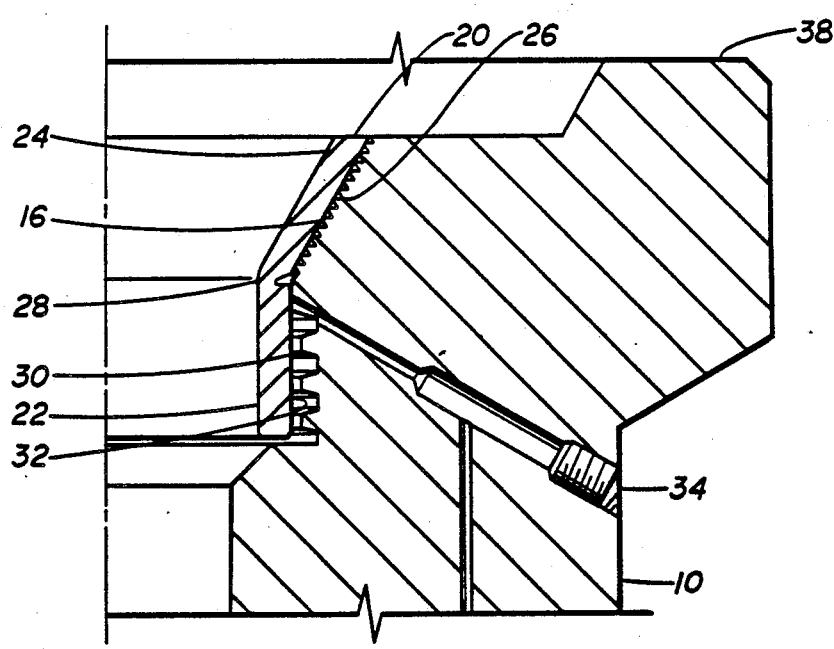
FIG. 3 is a partial sectional view of the improved insert of the present invention in position on the damaged sealing surface of the tubular member.
Figure 6:
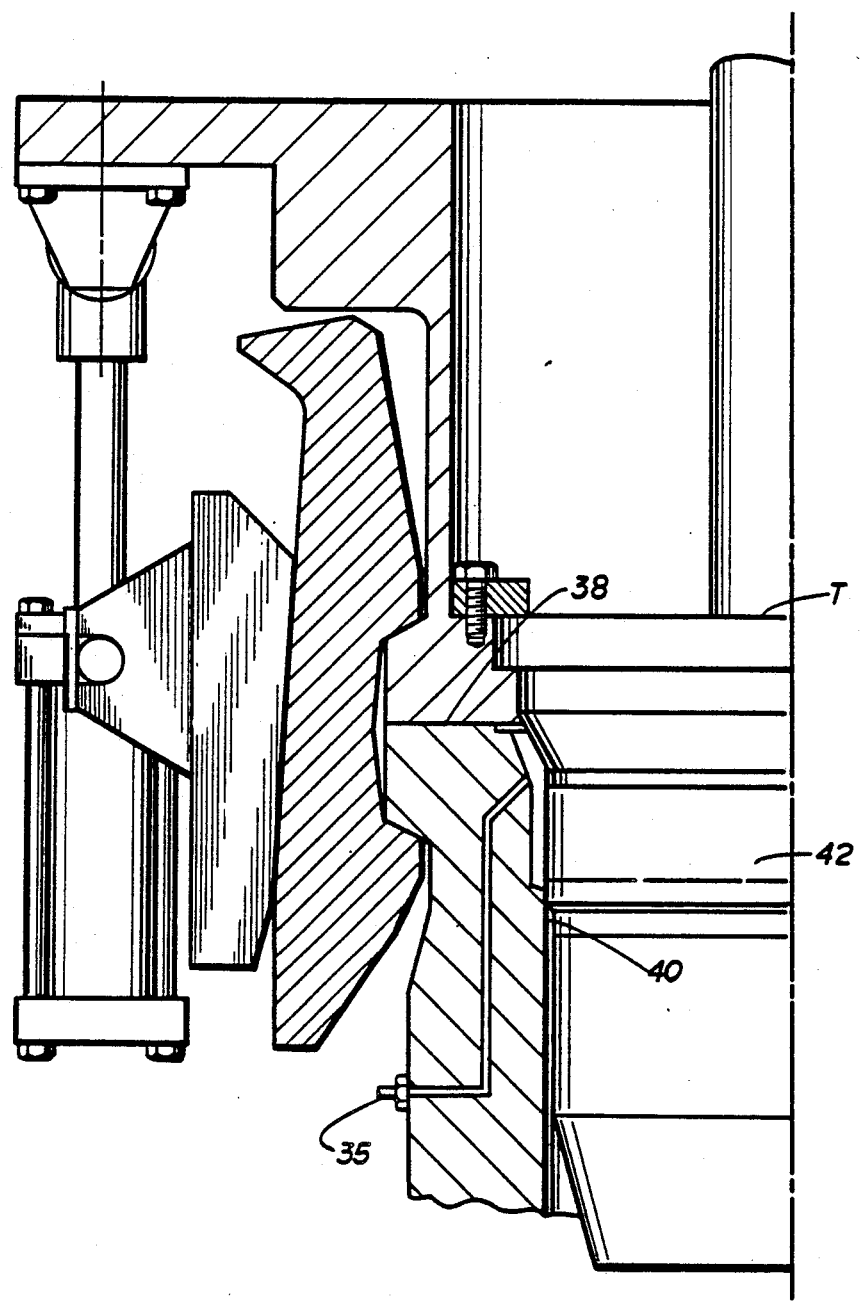
FIG. 6 is a partial sectional view of the damaged tubular member with the improved insert thereon and with the forging tool shown in position to forge the insert into tight sealing engagement within the tubular member.

With sleeve 20 in position as shown in FIG. 3, tool T is lowered so that it engages upper face 38 of housing 10 and the interior surface 40 of housing 10 below sleeve 20 as shown in FIG. 6. With sleeve 20 on sealing surface 16 and remote actuated clamp retaining tool T in position, tool T is actuated so that its resilient sleeve 42 is exposed to pressure on its interior and exerts a very substantial forging pressure on the interior of sleeve 20 forcing it into tight sealing engagement with sealing surface 16 and recess 30.

Figure 4:
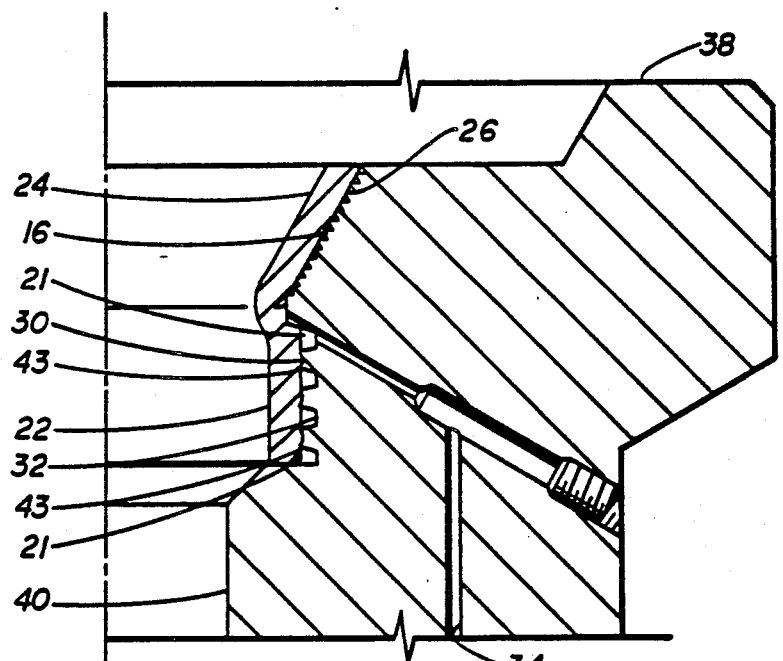
FIG. 4 partial sectional view of the improved insert of the present invention having been forged in place within the tubular member with the damaged sealing surface and in covering relationship thereto.

When the cold forging is completed, forming pressure on tool T is released and test pressure is applied to the interior of insert sleeve 20 between a seal against surface 38 and another seal against the interior surface 40 of housing 10 below sleeve 20 and any leakage is conducted through port 34 and line 35 to be detected at the remote location (the surface) port. Upon completion of testing line 35 is disconnected from housing 10 and is retrieved together with the retrieval of tool T from within housing 10. Sleeve 20 has been forged into tight sealing engagement with surface 16 and within recess 30 on housing 10. This engagement is especially tight in view of the sharp inwardly facing corners 43 on the lands which are positioned between the grooves 32 within recess 30. As can be seen in FIG. 4, such sharp corners 43 dig into the exterior of tubular portion 22 of sleeve 20 to ensure the tight sealing and gripping engagement of sleeve 20 with the interior of housing 10. Further, the effectiveness of this sealing engagement has been tested subsequent to the forging of sleeve 20.

Figure 5:
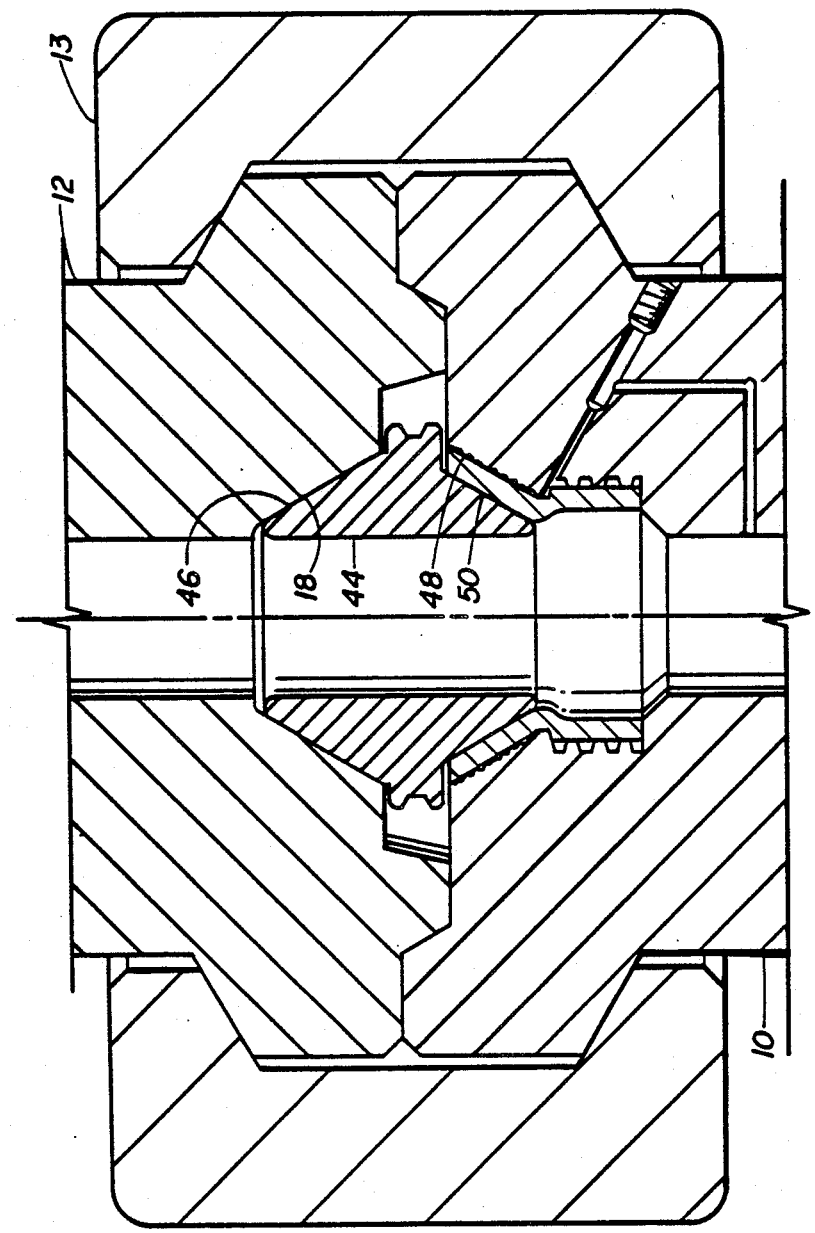
FIG. 5 is a sectional view of the completed joint with the improved sealing surface insert installed in sealing relationship between the two tubular members as shown in FIG. 4.

Thereafter, seal ring 44 and connector 12 are lowered into position on housing 10. As shown in FIG. 5, seal ring 44 includes upper sealing surface 46 which is tapered to mate with sealing surface 18 on connector 12 and lower sealing surface 48 which is tapered to mate with tapered sealing surface 50 on the interior of sleeve 20. As can be seen by a comparison of FIGS. 1 and 5, seal ring 44 rather than having symmetrical sealing surfaces, is shaped to mate with interior conical sealing surface 50 on sleeve 20 which is positioned on sealing surface 16 of housing 10. When connector 12 is secured to housing 10 by clamp 13 with seal ring 44 therebetween the joint is complete and will seal properly.

Figure 7:
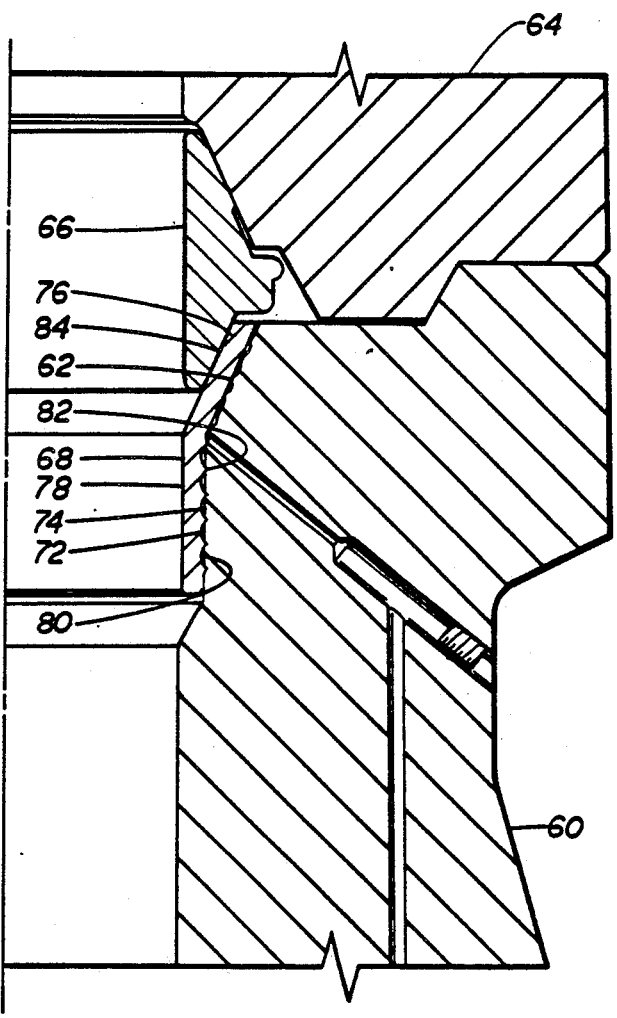
FIG. 7 in a partial sectional view of a modified form of improved insert of the present invention forged into tight sealing and engaging position within the damaged tubular member.

A modified form of the present invention is shown in FIG. 7. Tubular wellhead housing 60 includes tapered inner sealing surface 62 on its end which is secured to connector 64 and sealing ring 66 is positioned between housing 60 and connector 64. Insert sleeve 68 of a modified form has been cold forged into tight gripping and sealing engagement with the damaged sealing surface 70 of housing 60 and with the interior surface 72 of recess 74 as shown. It should be noted that insert sleeve 68 includes tapered portion 76 which tapers to mate with the taper of sealing surface 62 on the interior of the end of housing 60 and tubular portion 78 which is adapted to be received within recess 74 which is positioned immediately within sealing surface 62 as shown and has a diameter sufficient to accommodate the thickness of tubular portion 78 therein so that when insert sleeve 68 is forged into recess 74 the inner diameter of insert sleeve 68 does not differ from the inner diameter of the remainder of housing 60. Tubular portion 78 of insert sleeve 68 includes grooves 80 around its exterior surface to form a plurality of annular sharp teeth 82 which are moved into tight gripping and sealing engagement with the interior surface of recess 74 in housing 60. Suitable volume compensating material, such as previously described, is used in grooves 80 to ensure that fluids trapped between the exterior of insert sleeve 68 and interior surface 72 of recess 74 do not interfere with the forming of tubular portion 78 of sleeve 68.

The cold forging of modified insert sleeve 68 is performed as described previously herein with respect to insert sleeve 20. After cold forging, insert sleeve 68 provides inner sealing surface 84 against which sealing ring 66 may seal to provide a tight joint between subsea wellhead housing 60 and its tubular connector 64 without having to remove wellhead housing 60 from its subsea position to renew its sealing surface 62 after it has been damaged.

Figure 8:
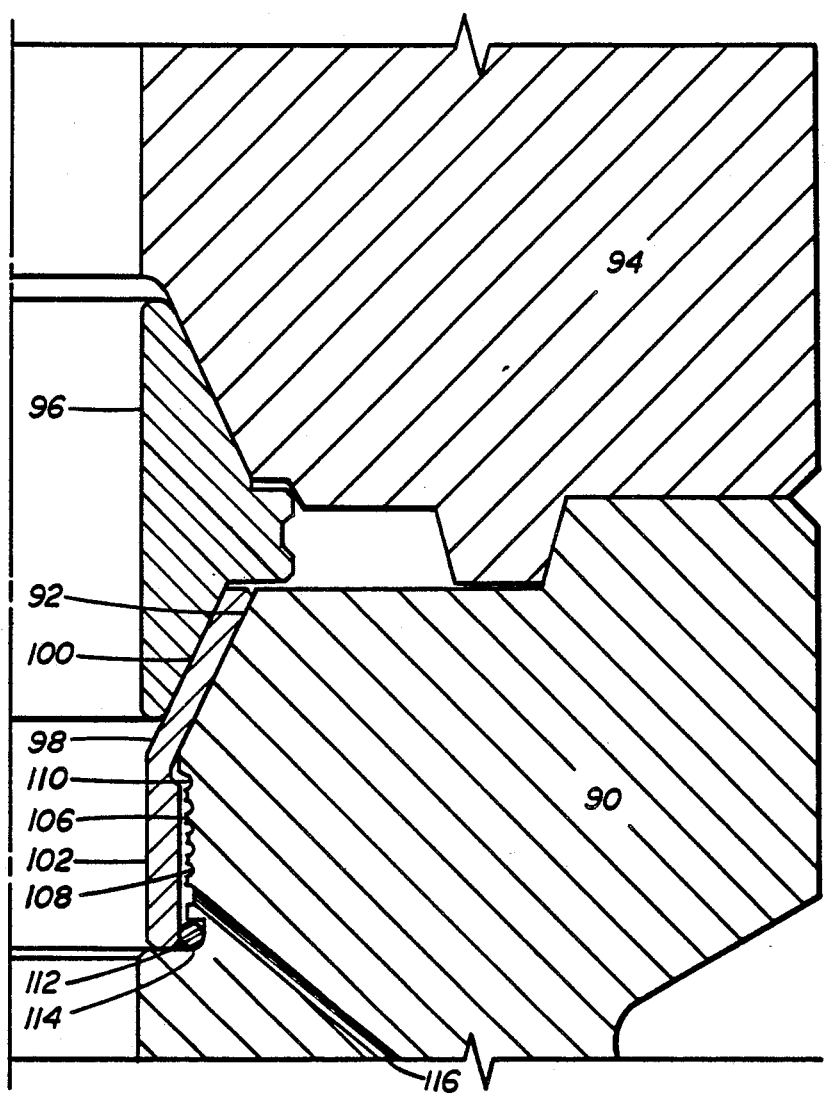

Another modified form of the present invention is shown in FIG. 8. Tubular wellhead housing 90 includes tapered inner sealing surface 92 on its end which is secured to connector 94 and sealing ring 96 is positioned between housing 90 and connector 94. Insert sleeve 98 is substantially the same as insert sleeve 20, previously described, and includes tapered sealing portion 100 and tubular portion 102. The exterior of tapered sealing portion 100 is seated on tapered surface 104 of housing 90 and tubular portion 102 has been cold forged into tight, sealing and gripping engagement with lands 106 formed between grooves 108 in the surface of recess 110. Volume compensating material, such as that previously described, is preferred to be positioned in grooves 108 to ensure the the cold forging of tubular portion 102 of insert sleeve 98 is not in any way affected by the presence of fluids within housing 90. Seal ring 112 is positioned within groove 114 in recess 110 and is sufficiently large that it comes into sealing engagement with the exterior of tubular portion 102 of insert sleeve 98 when it has been cold forged into position. Test port 116 communicates through housing 90 from within recess 110 immediately above seal ring 112 so that the sealing of tubular portion 102 and lands 106 can be checked as described above.

What is claimed is:

1. A tubular joint comprising
   a first tubular member having a central bore and a sealing surface tapering outwardly at one end of said member,
   a second tubular member having a central bore and a sealing surface tapering outwardly at the end of said member facing said one end of said first tubular member,
   a recess on the interior of at least one of said tubular members extending axially inward from the inner end of the sealing surface of such tubular member, said sealing surface on said at least one of said tubular members being damaged,
   a seal ring having a cylindrical bore and outer sealing surfaces being tapered for sealing between the sealing surfaces of the two tubular members,
   means for securing said first and second tubular members together with said seal ring in sealing engagement with their respective sealing surfaces, and
   an insert sleeve having a tubular portion positioned within said recess in the tubular member with the internal recess and a frusto-conical portion extending outwardly both axially and radially into covering relationship to the sealing surface of said tubular member,
   the insert sleeve being cold forged into tight sealing engagement within said recess and with the sealing surface of said tubular member, the inner surface of said frusto-conical portion of said insert sleeve having a taper mating with the taper of the seal ring whereby when said joint is held in tight engagement by said securing means said sealing ring sealingly engages the sealing surface of the tubular member which was not damaged and the sealing surface of said insert to provide a joint seal between said members.

2. A tubular joint according to claim 1 including
at least one groove on the interior of said recess against which the exterior of said tubular portion of said insert sleeve is cold forged.

3. A tubular joint according to claim 2 including
a plurality of grooves on the interior of said recess and
the lands between said grooves having inwardly facing sharp corners for gripping engagement with the exterior surface of the tubular portion of said insert sleeve when said insert sleeve is cold forged into said recess.

4. A tubular joint according to claim 1 including
a volume compensating material positioned between the tubular portion of said sleeve and the interior surface of said recess of said one of said tubular members.

5. A tubular joint according to claim 4 wherein
said volume compensating material is positioned against the exterior of the tubular portion of said sleeve.

6. A tubular joint according to claim 4 wherein
said volume compensating material is positioned within said recess.

7. A tubular joint according to claim 1 including
a plurality of annular sharp teeth on the exterior of the tubular portion of said insert sleeve whereby when said insert sleeve is cold forged into said recess said annular sharp teeth are moved into tight gripping and sealing engagement with the interior surface of said recess.

8. A tubular joint according to claim 1 including
a test port through the tubular member having the internal recess, said test port communicating with the interior of said tubular member at the exterior junction between the frusto-conical portion and the tubular portion of said insert sleeve.

9. A tubular joint according to claim 1 including
a test port through the tubular member having the internal recess, and
a seal ring positioned for sealing between the lower end of said tubular portion of said sleeve and said recess, said test port communicating with said recess immediately above said seal ring.

10. The method of repairing the damaged sealing surface on the interior of a subsea tubular wellhead housing at its joint end wherein the tubular housing includes an inner recess at the inner end of said sealing surface and a clamp for securing a connecting tubular member to the housing including the steps of
positioning an insert sleeve having a tubular portion and a frusto-conical portion within said tubular member so that said tubular portion is within said recess and said frusto-conical portion is against the damaged sealing surface of said tubular housing, and
cold forging said insert sleeve into tight sealing engagement with said damaged sealing surface and with the interior of said recess to secure said insert sleeve to said tubular wellhead housing and to provide said housing with a sealing surface for subsequent use in making connections to said wellhead housing.

11. The method according to claim 10 including the step of
initially removing the connecting tubular member, the seal ring and the clamp from the tubular housing.

12. The method according to claim 10 including the steps of
pressure testing the sealing of said insert sleeve against said recess in said tubular member.

13. An insert sleeve repair pair for the damaged internal tapered end sealing surface of a tubular member having a recess therein comprising
a frusto-conical portion, and
a tubular portion,
said frusto-conical portion having an external taper to sealingly engage the damaged sealing surface of the tubular member and an internal taper to engage the tapered sealing surface of a sealing ring used to seal against said tubular member,
the tubular portion being sized to be cold formed into sealing engagement in the recess on the interior of a tubular member to which the repair part is secured.

14. An insert sleeve according to claim 13 including
a plurality of annular sharp teeth on the exterior of said tubular portion.

15. An insert sleeve according to claim 13 including
a volume compensating material positioned on the exterior of the tubular portion of said sleeve.

* * * * *